United States Patent
Corbett et al.

(10) Patent No.: US 11,224,094 B1
(45) Date of Patent: Jan. 11, 2022

(54) SHARED NETWORKING INFRASTRUCTURE WITH MULTI-LINK CHANNEL BONDING

(71) Applicant: Rockwell Collins, Inc., Cedar Rapids, IA (US)

(72) Inventors: Matthew P. Corbett, Mount Vernon, IA (US); Brent James Nelson, Marion, IA (US); Jason R. Owen, Marion, IA (US); James Matthew Zaehring, Edmonds, WA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 16/124,778

(22) Filed: Sep. 7, 2018

(51) Int. Cl.
| | |
|---|---|
| *H04W 4/00* | (2018.01) |
| *H04W 84/06* | (2009.01) |
| *H04L 29/08* | (2006.01) |
| *G05D 1/02* | (2020.01) |
| *H04B 7/185* | (2006.01) |
| *H04L 12/40* | (2006.01) |

(52) U.S. Cl.
CPC ............ *H04W 84/06* (2013.01); *G05D 1/027* (2013.01); *H04B 7/18506* (2013.01); *H04L 67/12* (2013.01); *H04L 2012/4028* (2013.01)

(58) Field of Classification Search
None
See application file for complete search history.

(56) References Cited

U.S. PATENT DOCUMENTS

| | | | | |
|---|---|---|---|---|
| 2010/0195491 | A1* | 8/2010 | Gray | H04L 47/10 370/230 |
| 2014/0249737 | A1* | 9/2014 | Meunier | G08G 5/04 701/120 |
| 2014/0363169 | A1* | 12/2014 | Conger | H04B 10/40 398/115 |
| 2015/0016271 | A1* | 1/2015 | Lee | H04B 3/56 370/241 |
| 2015/0373154 | A1* | 12/2015 | Voigt | H04L 67/2823 370/389 |
| 2016/0029409 | A1* | 1/2016 | Mueller | H04W 72/044 370/329 |
| 2016/0176538 | A1* | 6/2016 | Bekanich | G07C 5/008 701/14 |
| 2016/0344467 | A1* | 11/2016 | Shelton | H01Q 1/286 |
| 2017/0327242 | A1* | 11/2017 | Lopez | H02M 7/44 |
| 2019/0356356 | A1* | 11/2019 | Lee | H04B 3/546 |

\* cited by examiner

*Primary Examiner* — Bob A Phunkulh
(74) *Attorney, Agent, or Firm* — Suiter Swantz pc llo

(57) ABSTRACT

A system for an airborne platform includes a network controller, a first subsystem having a number of devices configured to communicate a first data type, and a second subsystem having a number of devices configured to communicate a second data type. The network controller includes a processing circuit and is communicably coupled to the first subsystem and to the second subsystem. The processing circuit is configured to receive data relating to the first data type over a first plurality of communication channels and data relating to the second data type over a second plurality of communication channels. The processing circuit is further configured to multiplex the data relating to the first data type and the second data type to a multiplexed data stream configured for communication over a single communication channel. The processing circuit is further configured to transmit the multiplexed data stream over a data transmission line.

14 Claims, 4 Drawing Sheets

SHARED NETWORKING INFRASTRUCTURE WITH MULTI-LINK CHANNEL BONDING

BACKGROUND

The inventive concepts disclosed herein relate generally to the field of aircraft network systems. More particularly, embodiments of the inventive concepts disclosed herein relate to data communication in aircraft network systems including, but not limited to, a shared communication channel.

Avionics communication systems can employ several network subsystems for various topologies and domains. For example, one subsystem may be associated with the Aircraft Control Domain ("ACD"), which may be configured to carry data relating to deterministic information, such as flight critical parameters for the avionics system. Another subsystem may be associated with the Aircraft Information Services Domain ("AISD"), which may be configured to carry data relating to non-deterministic information. An avionics communication system may involve additional wiring and other network components to accommodate devices in the subsystems.

Multiple subsystems and domains in a communication system can result in significant aircraft wiring overhead, for example, to connect devices and equipment to the appropriate network. In some instances, equipment may reside on two networks. In order to provide data connectivity to devices in an aircraft, a communication system may require physically separate trunk lines, which can span the length of the aircraft and cause added weight and fuel costs. The communication system may also require additional bulkhead connectors that can be complex to wire and maintain.

SUMMARY

In one aspect, the inventive concepts disclosed herein are directed to a system. The system includes a first subsystem having a number of devices configured to communicate a first data type, a second subsystem having a number of devices configured to communicate a second data type, and a network controller communicably coupled to the first subsystem and to the second subsystem. The network controller includes a processing circuit having a processor and a memory. The processing circuit is configured to receive data relating to the first data type, the data relating to the first data type received over a first plurality of communication channels. The processing circuit is further configured to receive data relating to the second data type, the data relating to the second data type received over a second plurality of communication channels. The processing circuit is further configured to multiplex the data relating to the first data type and the second data type to a multiplexed data stream, the multiplexed data stream configured for communication over a single communication channel. The processing circuit is further configured to transmit the multiplexed data stream over a data transmission line.

In a further aspect, the inventive concepts disclosed herein are directed to a method. The method includes receiving, by a first processing circuit, data relating to a first data type, the data relating to the first data type provided over a first plurality of communication channels. The method further includes receiving, by the first processing circuit, data relating to a second data type, the data relating to the second data type provided over a second plurality of communication channels. The method further includes multiplexing, by the first processing circuit, the data relating to the first data type and the second data type to a multiplexed data stream, the multiplexed data stream configured for communication over a single communication channel. The method further includes transmitting, by the first processing circuit, the multiplexed data stream over a data transmission line. The method further includes receiving, by a second processing circuit, the multiplexed data stream. The method further includes demultiplexing, by the second processing circuit, the multiplexed data stream to data relating to the first data type and to data relating to the second type.

In a further aspect, the inventive concepts disclosed herein are directed to a processing circuit having a processor and a memory. The processing circuit is configured to receive data relating to the first data type, the data relating to the first data type received over a first plurality of communication channels. The processing circuit is further configured to receive data relating to the second data type, the data relating to the second data type received over a second plurality of communication channels. The processing circuit is further configured to multiplex the data relating to the first data type and the second data type to a multiplexed data stream, the multiplexed data stream configured for communication over a single communication channel. The processing circuit is further configured to transmit the multiplexed data stream over a data transmission line.

BRIEF DESCRIPTION OF THE DRAWINGS

Implementations of the inventive concepts disclosed herein may be better understood when consideration is given to the following detailed description thereof. Such description makes reference to the included drawings, which are not necessarily to scale, and in which some features may be exaggerated and some features may be omitted or may be represented schematically in the interest of clarity. Like reference numerals in the drawings may represent and refer to the same or similar element, feature, or function. In the drawings.

DETAILED DESCRIPTION

Figure 1:
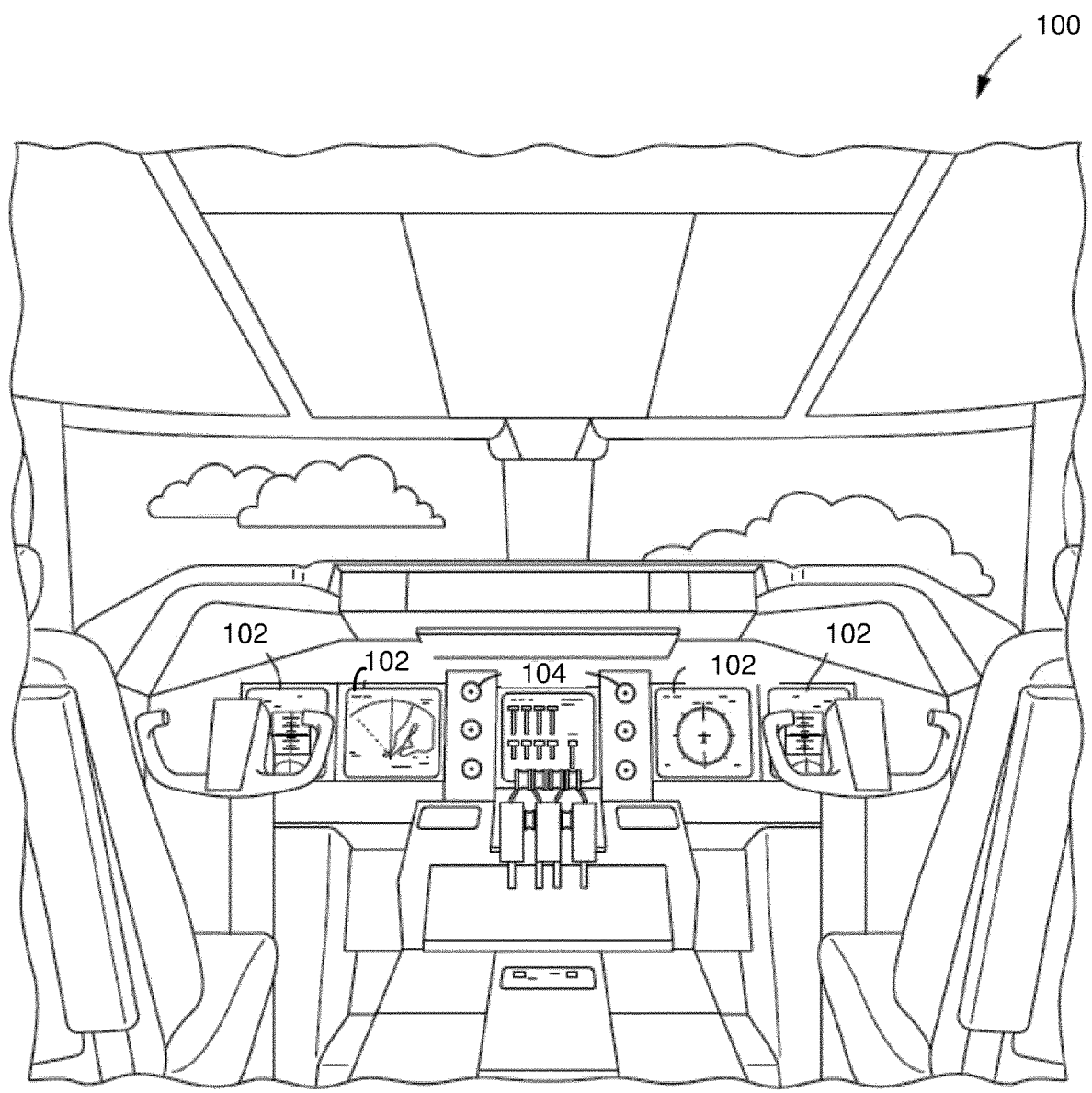
FIG. 1 is a schematic illustration of an exemplary embodiment of a control center of an aircraft, according to the inventive concepts disclosed herein.

Before explaining at least one embodiment of the inventive concepts disclosed herein in detail, it is to be understood that the inventive concepts are not limited in their application to the details of construction and the arrangement of the components or steps or methodologies set forth in the following description or illustrated in the drawings. In the following detailed description of embodiments of the instant inventive concepts, numerous specific details are set forth in order to provide a more thorough understanding of the inventive concepts. However, it will be apparent to one of ordinary skill in the art having the benefit of the instant disclosure that the inventive concepts disclosed herein may be practiced without these specific details. In other instances, well-known features may not be described in detail to avoid unnecessarily complicating the instant disclosure. The inventive concepts disclosed herein are capable of other embodiments or of being practiced or carried out in various ways. Also, it is to be understood that the phraseology and terminology employed herein is for the purpose of description and should not be regarded as limiting.

As used herein, a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only, and should not be construed to limit the inventive concepts disclosed herein in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B is true (or present).

In addition, use of the "a" or "an" are employed to describe elements and components of embodiments of the instant inventive concepts. This is done merely for convenience and to give a general sense of the inventive concepts, and "a" and "an" are intended to include one or at least one and the singular also includes the plural unless it is obvious that it is meant otherwise.

As used herein, any reference to "one embodiment" or "some embodiments" means that a particular element, feature, structure, or characteristic described in connection with the embodiment is included in at least one embodiment of the inventive concepts disclosed herein. The appearances of the phrase "in some embodiments" in various places in the specification are not necessarily all referring to the same embodiment, and embodiments of the inventive concepts disclosed may include one or more of the features expressly described or inherently present herein, or any combination or sub-combination of two or more such features, along with any other features which may not necessarily be expressly described or inherently present in the instant disclosure.

The inventive concepts disclosed herein can be utilized in a number of control systems for various types of applications. While the present disclosure describes systems and methods implementable in an aircraft, the inventive concepts disclosed herein may be used in any type of environment (e.g., in another aircraft, a spacecraft, a ground-based vehicle, a drone, a simulator, or in a vehicle or non-vehicle application such as a ground-based display system, an air traffic control system, a radar system, a drone control system, or a virtual display system). While certain examples and embodiments of the inventive concepts disclosed herein are described with respect to a pilot of an aircraft, it will be appreciated that users other than a pilot may use and benefit from some inventive concepts disclosed herein with respect to other vehicles and/or objects.

In current and existing systems, an aircraft network system may employ two or more subsystems communicating various types of data. The subsystems may be isolated to maintain quality of service and other requirements. For example, one subsystem may be associated with the Aircraft Control Domain ("ACD"), which may be configured to carry data relating to deterministic flight critical parameters for the avionics system. Another subsystem may be associated with the Aircraft Information Services Domain ("AISD"), which may be configured to carry data relating to non-deterministic information. In order to provide data connectivity to devices of the ACD subsystem and to devices of the AISD subsystem, physically separate trunk lines may span the length of the aircraft for each subsystem. This aircraft network system may also involve numerous bulkhead connectors and other network components, and the aircraft may experience additional weight, fuel costs, and maintenance costs.

Broadly, embodiments of the inventive concepts disclosed herein are directed to facilitating data communication among aircraft devices via a multi-link channel bonding and isolation function configured to multiplex data received over multiple communication channels to a multiplexed data stream. The multiplexed data stream may be transmitted as a single communication channel, allowing for reduced data transmission lines, connectors, and other components required by an aircraft network. In some embodiments, a processing circuit is provided within a network switch, such as an avionics control domain network switch. The processing circuit can be configured to receive data from a plurality of devices via a plurality of communication channels, and the processing circuit can be configured to multiplex the received data to a single communication channel. In some embodiments, the processing circuit is configured to multiplex data to a single multiplexed data stream using a time-division multiplexing scheme that ensures logical segregation between the multiple domains sharing the communication channel. The processing circuit may be configured to multiplex data to using any suitable manner. A second processing circuit (e.g., provided within a second network switch) may be configured to receive the multiplexed data over a data transmission line. The second processing circuit may be configured to demultiplex the multiplexed data stream to a data format readable by recipient devices.

Referring now to FIG. 1, a schematic illustration of an exemplary embodiment of a control center of an aircraft is shown according to some inventive concepts disclosed herein. The aircraft control center 100 (or "cockpit") includes one or more flight displays 102 and one or more user interface (UI) elements 104. The flight displays 102 may be implemented using any of a variety of display technologies, including CRT, LCD, organic LED, dot matrix display, and others. The flight displays 102 may be navigation (NAV) displays, primary flight displays, electronic flight bag displays, tablets such as iPad® computers manufactured by Apple, Inc. or tablet computers, synthetic vision system displays, head up displays (HUDs) with or without a projector, wearable displays, watches, Google Glass® and so on. The flight displays 102 may be used to provide information to the flight crew, thereby increasing the flight crew's visual range and enhancing their decision-making abilities. The flight displays 102 may be configured to function as, for example, a primary flight display (PFD) used to display altitude, airspeed, vertical speed, navigation and traffic collision avoidance system (TCAS) advisories; a crew alert system (CAS) configured to provide alerts to the flight crew; a multi-function display used to display navigation maps, weather radar, electronic charts, TCAS traffic, aircraft maintenance data and electronic checklists, manuals, and procedures; an engine indicating and crew-alerting system (EICAS) display used to display critical engine and system status data, and so on. Other types and functions of the flight displays 102 are contemplated and will be apparent to those skilled in the art.

In some embodiments, the flight displays 102 provide an output from an aircraft-based system, a ground-based system, a satellite-based system, or from a system of another aircraft. In some embodiments, the flight displays 102 provide an output from an aircraft-based weather radar system, LIDAR system, infrared system or other system on the aircraft. For example, the flight displays 102 may include an avionics display, a joint display, an air traffic display, a weather radar map, and a terrain display. The flight displays 102 include an electronic display or a synthetic vision system (SVS). For example, the flight displays 102 may include a display configured to display a two-dimensional (2-D) image, a three-dimensional (3-D) perspective image, or a four-dimensional (4-D) display. Other views of air traffic information, terrain, and/or weather information may also be provided (e.g., plan view, horizontal view, and vertical view). The views shown on the flight displays 102 may include monochrome or color graphical representations of the displayed information, which may include an indication of altitude of other aircraft, weather conditions, or terrain, or the altitude and/or location of such information relative to the aircraft.

The UI elements 104 may include, for example, dials, switches, buttons, touch screens, keyboards, a mouse, joysticks, cursor control devices (CCDs) or other multi-function key pads certified for use with avionics systems. The UI elements 104 may be configured to, for example, allow one or more aircraft crew members to interact with various avionics applications and perform functions such as data entry, manipulation of navigational maps, and moving among and selecting checklist items. In some embodiments, the UI elements 104 may be used to provide a user input for adjusting one or more aircraft controls and/or a setting for configuring an aircraft control. For example, the UI elements 104 may be configured to receive an input relating to a desired airspeed, such as an airspeed reference value, threshold values, and the like. The UI elements 104 may also (or alternatively) be used by an aircraft crew member to interface with or manipulate the displays of the flight displays 102. For example, the UI elements 104 may be used by an aircraft crew member to adjust the brightness, contrast, and information displayed on the flight displays 102. The UI elements 104 may additionally be used to acknowledge or dismiss an indicator provided by the flight displays 102. Further, the UI elements 104 may be used to correct errors on the flight displays 102. Other UI elements 104, such as indicator lights, displays, display elements, and audio alerting devices, may be configured to warn of potentially threatening conditions such as severe weather, terrain, and obstacles.

Figure 2:
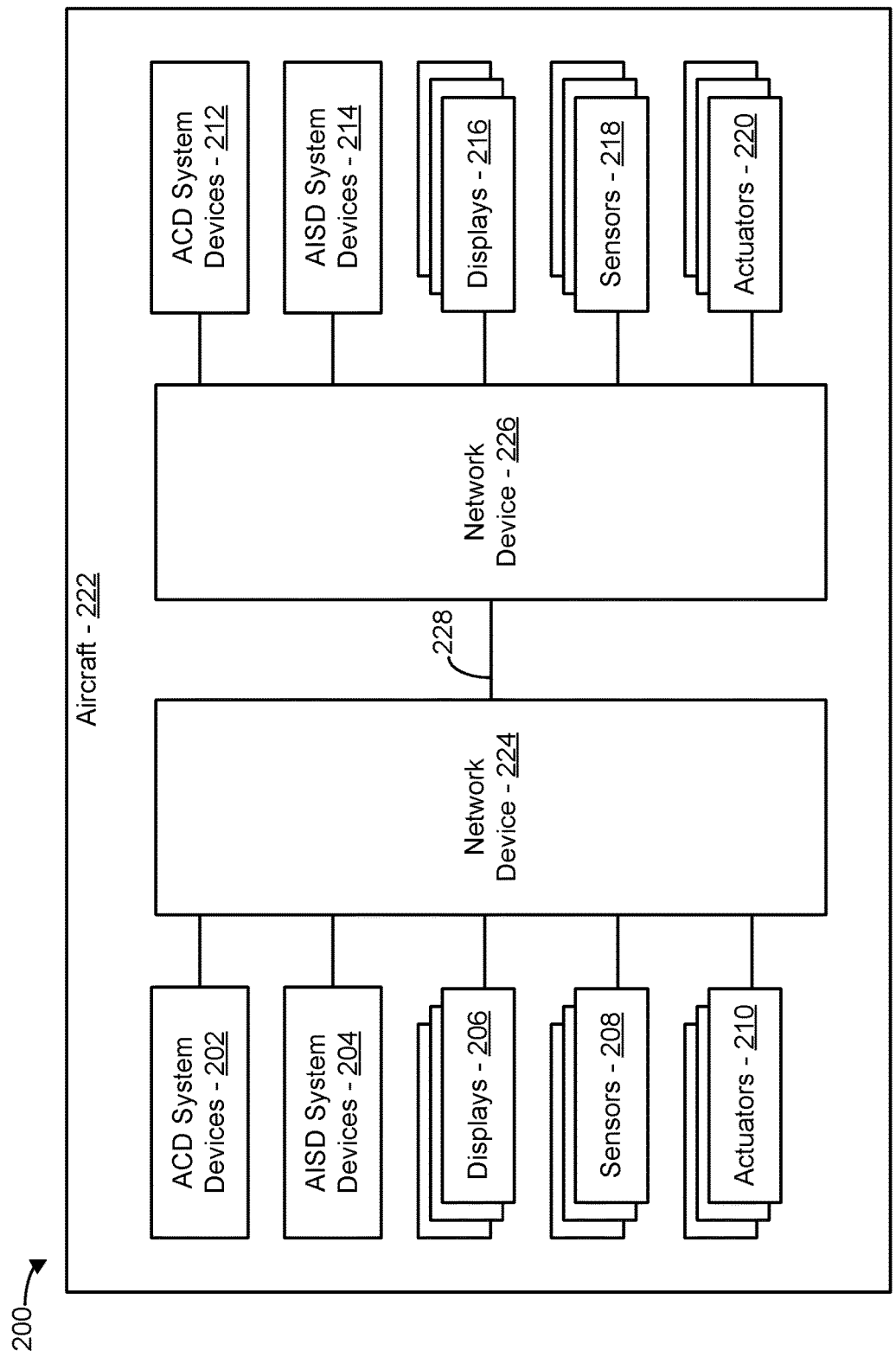
FIG. 2 is a schematic block diagram of a system configured for a shared networking infrastructure with multi-link channel bonding for the control system illustrated in FIG. 1, according to the inventive concepts disclosed herein.

Referring now to FIG. 2, a system 200 of an aircraft network infrastructure configured for multi-link channel bonding is shown according to some inventive concepts disclosed herein. In some embodiments, the system 200 may be provided in an aircraft 222 and/or the aircraft control center 100 of FIG. 1. The system 200 is shown to include a first network device 224 communicably connected to one or more aircraft control domain ("ACD") system devices 202, one or more aircraft information services domain ("AISD") system devices 204, displays 206, sensors 208, and actuators 210 that may be provided in an airborne platform (e.g., an aircraft).

The system 200 is also shown to include a second network device 226 communicably connected to one or more ACD system devices 212, one or more AISD system devices 214, displays 216, sensors 218, and actuators 220 that may be provided in an airborne platform. In some embodiments, one or more of the first network device 224, the second network device 226, the ACD system devices 202 and 212, the AISD system devices 204 and 214, displays 206 and 216, sensors 208 and 218, and actuators 210 and 220 are not provided in system 200. In some embodiments, the system 200 includes other systems and components for general aircraft operation.

Each of the network device 224 and the network device 226 may be generally configured to communicate data between any suitable type of network device and/or computing device. In some embodiments, one or both of the network device 224 and network device 226 corresponds to a network switch, such as an avionics control domain network switch. Although the system 200 is shown to include two network devices (i.e., the network devices 224 and 226), any number of network devices can be included in various other embodiments.

In some embodiments, the network device 224 and/or the network device 226 includes a communications interface (not shown), which may be a wired or wireless interface configured to facilitate communications with any of the devices, components, and/or system. The communications interface can be configured for communication using any type of communication protocol or network, and may include hardware and software necessary to facilitate data communications. For example, the communications interface can include a number of ports configured for wired communication (e.g., an RJ45 or ethernet port, fiber optic or optical fiber port, etc.). In some embodiments, the communications interface includes the hardware and machine-readable media sufficient to support communication over multiple channels of data communication.

The network device 224 and/or network device 226 may be configured to communicate data at a particular network layer, such as the data link layer (layer two). It should be understood that the network device 224 and network device 226 may be configured to exchange data using any suitable communication protocol (e.g., TCP/IP, OSI, etc.) and at any suitable layer. Further, the network device 224 may be configured to receive any type of data from any source (e.g., the ACD system devices 202, the AISD system devices 204, the displays 206, the sensors 208, and the actuators 210). For example, in some embodiments, the network device 224 is configured to receive data relating to ARINC 664 and ARINC 818. The network device 224 may be configured to receive data via any number of communication channels.

In an example implementation, the network device 224 may be configured to transmit a multiplexed data stream to the network device 226 using a single communication channel over the data transmission line 228. This may be desirable, for example, to facilitate data communication between the ACD system devices 202 and the ACD system devices 212, while simultaneously facilitating data communication between the AISD system devices 204 and the AISD system devices 214. In this regard, the network device 224 may be configured to receive data provided over two communication channels from the ACD system devices 202, and receive data provided over another two communication channels from the AISD system devices 204.

Referring still to the above example embodiment, the network device 224 may be configured to multiplex the received four communication channels of data to a single communication channel using an isolation and channel bonding function. In this regard, the network device 224 may multiplex received data to prioritize one or more data types and/or devices, for example to maintain a quality of service requirement, a bandwidth requirement, etc. The multiplexed data stream may correspond to time-division multiplexing, frequency-division multiplexing, code-division multiplexing, and/or any suitable multiplexing scheme. The network device 224 may be configured to multiplex received data to any number of communication channels.

The network device 226 is configured to receive the multiplexed data stream from the network device 224 over a single transmission line (e.g., the data transmission line 228) in some embodiments. The network device 226 may be configured to demultiplex or otherwise translate the received data to a compatible format usable by one or more recipient devices (e.g., the ACD system devices 212, the AISD system devices 214). In this regard, the network device 226 may be configured to route the demultiplexed data to the one or more recipient devices.

Referring still to FIG. 2, ACD system devices 202 may include one or more devices configured to communicate data relating to aircraft traffic control and other aircraft operation. In some embodiments, the ACD system devices 202 may generally be configured to communicate data relating to deterministic flight information. In some embodiments, the AISD system devices 204 may include one or more devices configured to communicate data relating to non-deterministic flight information. In some embodiments, the ACD system devices 202 and/or the AISD system devices 204 includes one or more of a display (e.g., the displays 206), a sensor (e.g., the sensors 208), and/or an actuator (e.g., the actuators 210). The ACD system devices 212 and the AISD system devices 214 may be configured as described herein with reference to the ACD system devices 202 and the AISD system devices 204, respectively. In this regard, the ACD system devices 212 and/or the AISD system devices 214 may include one or more of a display (e.g., the displays 216), a sensor (e.g., the sensors 218), and/or an actuator (e.g., the actuators 220).

The displays 206 may be any device configured to provide a display to a user, such as an image or a video. In some embodiments, the displays 206 may be configured as described with reference to the flight displays 102. For example, displays 206 can be configured to generate a display relating to a two-dimensional perspective or a three-dimensional perspective of an image and/or data relating to flight operation. The displays 206 may be generated using a processing circuit (not shown) as described with reference to FIG. 1. In some embodiments, the displays 206 can be generated by a processing circuit configured to receive ARINC 818 data for generating the display. The displays 216 shown in the system 200 may be configured as described herein with reference to the display 206.

The sensors 208 may include any suitable number and type of sensors including, for example, a fuel sensors, a location tracking sensor (e.g., GPS), a turbulence sensors, pressure sensor, an optical systems (e.g., camera system, infrared system), a weather sensor such as outside air temperature sensors, a winds at altitude sensor, an INS G load (in-situ turbulence) sensor, a barometric pressure sensor, a humidity sensor, and any other aircraft sensors or sensing system that may be used to monitor the performance of an aircraft or weather local to or remote from the aircraft. In some embodiments, the sensors 208 may include one or more sensors configured to acquire data indicative of speed (e.g., indicated airspeed, a true airspeed, and groundspeed), an angle of attack, a pitch angle, a flight path angle, an acceleration, a rate of descent, and/or an altitude. The sensors 208 may be located in various positions on the aircraft 222, and a single sensor may be configured to acquire more than one type of sensor data. The sensors 218 shown in the system 200 may be configured as described herein with reference to the sensors 208.

The system 200 is shown to also include one or more actuators 210. The actuators 210 may include any suitable number and type of actuator configured for aircraft operations of the aircraft 222. For example, the actuators 210 may include an actuator mounted on an aircraft wing and configured to control movement of an aircraft flap. The actuators 220 shown in the system 200 may be configured as described herein with reference to the actuators 210.

Figure 3:
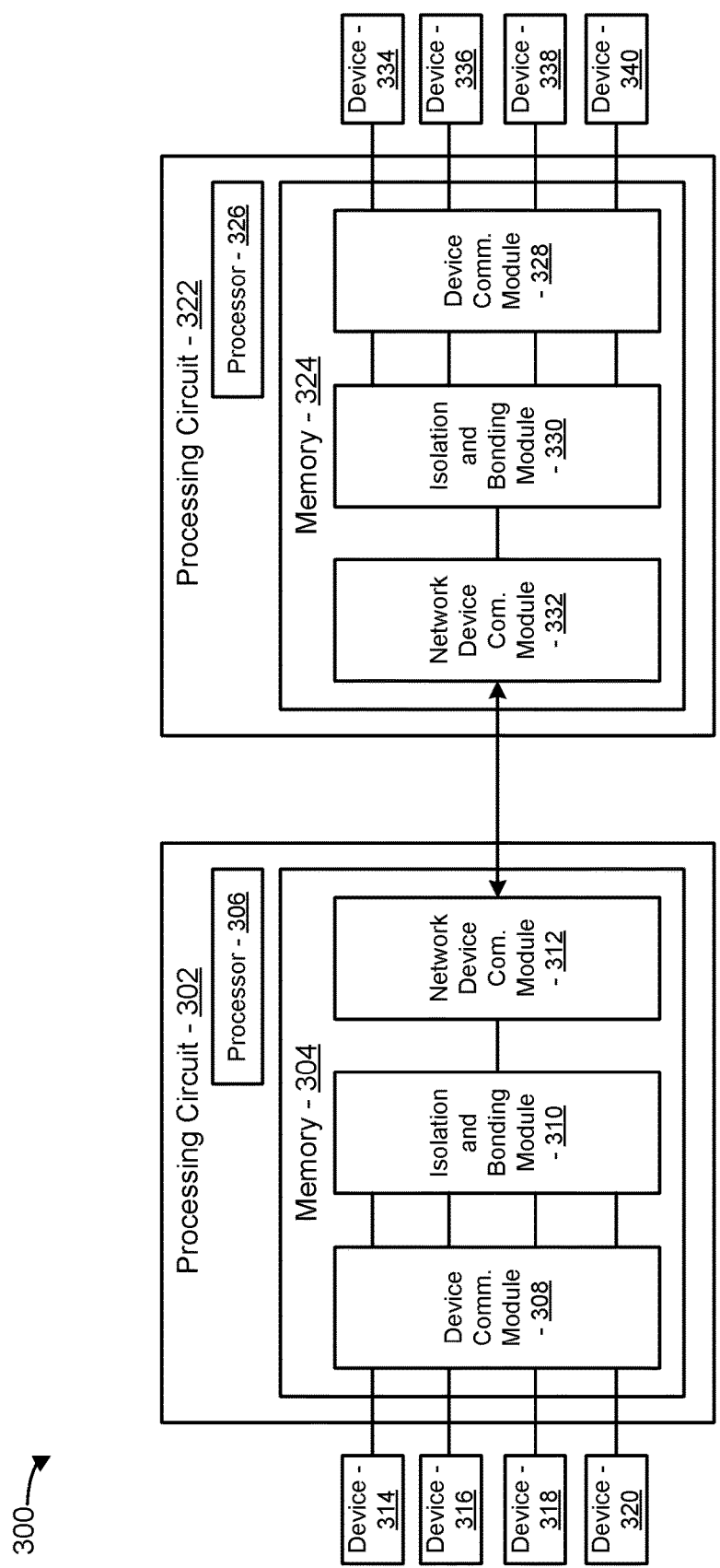
FIG. 3 is a schematic block diagram of processing circuits that may be used with the system configured for a shared networking infrastructure with multi-link channel bonding illustrated in FIG. 2, according to the inventive concepts disclosed herein.

Referring to FIG. 3, a system 300 configured for a shared networking infrastructure with multi-link channel bonding is shown according to some inventive concepts disclosed herein. The system 300 may be configured to facilitate communication between the devices 314-320 and the devices 334-340 in some embodiments. The system 300 is shown to include a processing circuit 302 and a processing circuit 322. In some embodiments, the processing circuit 302 is provided with the network device 224, and the processing circuit 322 is provided with the network device 226 as described with reference to FIG. 2. In this regard, the processing circuit 302 and the processing circuit 322 may be configured to facilitate data communications of a multiplexed data stream over a data transmission line (e.g., the data transmission line 228) to facilitate communication between the devices 314-320 and the devices 334-340 in some embodiments. The processing circuit 302 and/or the processing circuit 322 may be provided with any suitable network device or computing device.

In other embodiments, system 300 can include more or fewer devices. In some embodiments, one or more of the devices 314-320 includes at least one of the ACD system devices 202, the AISD system devices 204, the displays 206, the sensors 208, and/or the actuators 210. In some embodiments, one or more of the devices 334-340 includes at least one of the ACD system devices 212, the AISD system devices 214, the displays 216, the sensors 218, and/or the actuators 220.

In an example embodiment of system 300, each of the devices 314, 316, 318, and 320 is configured to communicate data with the devices 334, 336, 338, and 340, respectively. For example, devices 314 and 316 may be ACD system devices (e.g., the ACD system devices 202) configured to communicate with devices 334 and 336, which may be another set of ACD system devices (e.g., the ACD system devices 212). In this example, devices 318 and 320 may be AISD devices (e.g., the AISD devices 204) configured to communicate with devices 338 and 340, which may be another set of AISD devices (e.g., the AISD devices 214).

Current and existing systems may involve data corresponding to the ACD system devices to be independently transferred via a set of at least one distinct communication channels and data corresponding to the AISD system devices to be independently transferred via another set of distinct communication channels. Accordingly, communication of data relating to both of ACD system devices and AISD system devices may require multiple data transmission lines to facilitate the ACD data communication channels and the AISD communication channels. However, as shown in system 300, the processing circuit 302 can facilitate reducing the number of communication channels and data transmission lines by multiplexing data received from the devices 314-320 to a single data stream and transmitting the multiplexed data stream as one communication channel over a data transmission line. In this regard, the processing circuit 322 can be configured to receive and demultiplex the multiplexed data stream to a data type or format readable by each of the devices 334-340.

The processing circuit 302 is shown to include a processor 306 and a memory 304, and the processing circuit 322 is shown to include a processor 326 and a memory 324. Each of the processor 306 and the processor 326 can be implemented as a general or specific purpose processor, an application specific integrated circuit (ASIC), one or more field programmable gate arrays (FPGAs), a group of processing components, or other suitable electronic processing components. In some embodiments, the processing circuit 302 and/or the processing circuit 322 includes a communications interface (not shown), which may be a wired or wireless interface configured to facilitate communications with any of the devices, components, and/or system. The communications interface can be configured for communication using any type of communication protocol or network, and may include hardware and software necessary to facilitate data communications as described herein.

The memory 304 is one or more devices (e.g., RAM, ROM, flash memory, hard disk storage) for storing data and computer code for completing and facilitating the various user or client processes, layers, and modules described in the present disclosure. The memory 304 may be or include volatile memory or non-volatile memory and may include database components, object code components, script components, or any other type of information structure for supporting the various activities and information structures of some inventive concepts disclosed herein. The memory 304 is communicably connected to the processor 306 and includes computer code or instruction modules for executing one or more processes described herein. The memory 304 can include various circuits, software engines, and/or modules that cause the processor 306 to execute the systems and methods described herein. In some embodiments, the processing circuit 302 also includes a graphics processing unit (not shown), which can be configured to retrieve electronic instructions for generating a visual representation for one or more of the flight displays 102 and execute the electronic instructions in order to generate the visual representation. The memory 324 may be configured as described herein with reference to the memory 304.

The memory 304 is shown to include a device communication module 308, an isolation and bonding module 310, and a network device communication module 312. In some embodiments, the device communication module 308, the isolation and bonding module 310, and/or the network device communication module 312 are embodied as machine or computer-readable media that is executable by a processor, such as the processor 306. The memory 324 is shown to include a device communication module 328, an isolation and bonding module 330, and a network device communication module 332. In some embodiments, the device communication module 328, the isolation and bonding module 330, and/or the network device communication module 332 are embodied as machine or computer-readable media that is executable by a processor, such as the processor 326.

As described herein and amongst other uses, the machine-readable media facilitates performance of certain operations to enable determining a dynamic airspeed reference value. For example, the machine-readable media can provide an instruction (e.g., command, etc.) to acquire data. In this regard, the machine-readable media is a non-transitory media and can include programmable logic that defines the frequency of acquisition of the data (or, transmission of the data). The computer readable media can include code, which can be written in any programming language including, but not limited to, Java or the like and any conventional procedural programming languages, such as the "C" programming language or similar programming languages. The computer readable program code can be executed on one processor or multiple remote processors. In the latter scenario, the remote processors can be connected to each other through any type of network (e.g., CAN bus, etc.).

In another configuration, one or more of the device communication modules 308 and 328, the isolation and bonding modules 310 and 330, and the network device communication modules 312 and 332 are embodied as hardware units, such as electronic control units. As such, the device communication modules 308 and 328, the isolation and bonding modules 310 and 330, and the network device communication modules 312 and 332 can be embodied as one or more circuitry components including, but not limited to, processing circuitry, network interfaces, peripheral devices, input devices, output devices, sensors, etc.

In some embodiments, one or more of the device communication modules 308 and 328, the isolation and bonding modules 310 and 330, and the network device communication modules 312 and 332 can take the form of one or more analog circuits, electronic circuits (e.g., integrated circuits (IC), discrete circuits, system on a chip (SOCs) circuits, microcontrollers, etc.), telecommunication circuits, hybrid circuits, and any other type of "circuit." In this regard, the device communication modules 308 and 328, the isolation and bonding modules 310 and 330, and the network device communication modules 312 and 332 can include any type of component for accomplishing or facilitating achievement of the operations described herein. For example, a circuit as described herein can include one or more transistors, logic gates (e.g., NAND, AND, NOR, OR, XOR, NOT, XNOR, etc.), resistors, multiplexers, registers, capacitors, inductors, diodes, wiring, and so on), and programmable hardware devices (e.g., field programmable gate arrays, programmable array logic, programmable logic devices or the like). The device communication modules 308 and 328, the isolation and bonding modules 310 and 330, and the network device communication modules 312 and 332 can each include a processor and one or more memory devices for storing instructions that are executable by each of the processors. The one or more memory devices and processor(s) can have the same definition as provided herein with respect to the memory 304 and the processor 306.

In some hardware unit configurations, the device communication module 308, the isolation and bonding module 310, and/or the network device communication module 312 can be physically located in separate locations in the processing circuit 302. Alternatively, the device communication module 308, the isolation and bonding module 310, and/or the network device communication module 312 can be embodied in or within a single unit/housing of the processing circuit 302. In some embodiments, the device communication module 308, the isolation and bonding module 310, and/or the network device communication module 312 can be a hybrid of any device disclosed above, such as a specific purpose processor or task execution unit (e.g., configured to execute a micro node) with additional circuitry specifically configured to execute bandwidth calculations, frame analysis, or routing determinations.

In some hardware unit configurations, the device communication module 328, the isolation and bonding module 330, and/or the network device communication module 332 can be physically located in separate locations in the processing circuit 322. Alternatively, the device communication module 328, the isolation and bonding module 330, and/or the network device communication module 332 can be embodied in or within a single unit/housing of the processing circuit 322. In some embodiments, the device communication module 328, the isolation and bonding module 330, and/or the network device communication module 332 can be a hybrid of any device disclosed above, such as a specific purpose processor or task execution unit (e.g., configured to execute a micro node) with additional circuitry specifically configured to execute bandwidth calculations, frame analysis, or routing determinations.

Referring still to FIG. 3, the data communication module 308 is configured to receive data over any number of communication channels and pass the received data to the isolation and bonding module 310. In system 300, the device communication module 308 is shown to receive data from devices 314-320. In this regard, the device communication module 308 may receive data over four communication channels, with one communication channel for each of the devices 314-320. In some embodiments, the device communication module 308 is configured to pass each channel of data to the isolation and bonding module 310.

In some embodiments, the device communication module 308 is configured to detect a type of device (e.g., the ACD system devices 212) and/or a type of data (e.g., ARINC 664 data) received from each of the devices 314-320. The device communication module 308 may be configured to perform a procedure for initialization, authentication sequence, and/or authorization sequences with each of the devices 314-320. For example, the device communication module 308 may be configured to exchange data with the device 314 for identifying features or functions of the device 314. Additionally or alternatively, the device communication module 308 may analyze a data packet or a frame (e.g., header information) of data received from one or more of the devices 314-320 to identify a type of device or type of data. In some embodiments, the data communication module 308 is configured to receive data from the isolation and bonding module 310 and pass received information to the devices 314-320.

In some embodiments, the isolation and bonding module 310 is configured to multiplex data received over two or more communication channels to a multiplexed data stream, which may be provided over a single communication channel. The isolation and bonding module 310 may be configured to employ any suitable technique or process to multiplex received data. In some embodiments, the isolation and bonding module 310 uses a time-division multiplex process. In other embodiments, the isolation and bonding module 310 additionally or alternatively uses frequency-division multiplex and/or code-division multiplex. The isolation and bonding module 310 can be configured to transmit the received data to the network device communication module 312.

In some embodiments, the isolation and bonding module 310 is configured to process or configure received data in a format corresponding to a suitable communication protocol (e.g., TCP/IP, OSI, etc.) and/or a layer of the communication protocol (e.g., the data link layer). For example, the isolation and bonding module may be configured to encapsulate data packets into data frames, add or remove header information, synchronize the data frames, perform error-checking, etc. In some embodiments, the communication protocol and/or layer of the isolation and bonding module 310 depends on a type of network device (e.g., an avionics control domain network switch) configured with the processing circuit 302.

In some embodiments, the isolation and bonding module 310 is configured to multiplex data to prioritize one or more data types and/or devices, to maintain a quality of service requirement, a bandwidth requirement, etc. For example, the isolation and bonding module 310 may be configured to prioritize data relating to deterministic information (e.g., between the ACD system devices 202 and the ACD system devices 212) over data relating to non-deterministic traffic (e.g., between the AISD system devices 204 and the AISD system devices 214). In another example, the isolation and bonding module 310 may be configured to prioritize a type of data relating to a particular standard or format of ARINC data (e.g., ARINC 664, ARINC 818).

In the example embodiment of FIG. 3, the isolation and bonding module 310 is shown to receive four communication channels from devices 314-320 via the device communication module 308. In other embodiments, the isolation and bonding module 310 may be configured to receive data over more or fewer communication channels. In some embodiments, the isolation and bonding module 310 is configured to multiplex received data to two or more data streams provided over two or more communication channels. In some embodiments, the isolation and bonding module 310 is configured to receive multiplexed data and demultiplex the received data to two or more communication channels of a data type or format readable by the devices 314-320. In this regard, the isolation and bonding module 310 may be configured to communicate the demultiplexed data to the device communication module 308.

The network device communication module 312 is configured to receive a multiplexed data stream and communicate the multiplexed data with other network devices or processing circuits (e.g., the processing circuit 322). In this regard, the network device communication module 312 can be configured to generate or configure a communication channel for communicating the multiplexed data stream and/or transmit the multiplexed data stream using the communication channel. In some embodiments, the network device communication module 312 is configured to transmit the multiplexed data stream over a data transmission line (e.g., the data transmission line 228). The network device communication module 312 and/or the processing circuit 302 may be configured with a suitable communication interface for transmitting the multiplexed data stream over the data transmission line as described herein.

In some embodiments, the network device communication module 312 is configured to communicate the multiplexed data using two or more communication channels over two or more data transmission lines as described herein. In some embodiments, the network device communication module 312 is additionally configured to receive data from one or more network devices or processing circuits (e.g., the processing circuit 322). In this regard, the network device communication module 312 may be configured to pass received data to the isolation and bonding module 310 and/or any other processing circuits, devices or systems.

In some embodiments, the processing circuit 322 is generally configured to receive a multiplexed data stream from a processing circuit and/or a network device, demultiplex the multiplexed data stream, and/or route the demultiplexed data to a number of recipient devices. In this regard, the processing circuit 322 may be configured to facilitate data communication between the devices 334-340 with other devices or processing circuits of the system 300 as described herein. In some embodiments, the device communication module 328 is configured as described herein with reference to the device communication module 308, the isolation and bonding module 330 is configured as described herein with reference to the isolation and bonding module 310, and the network device communication module 332 is configured as described herein with reference to the network device communication module 312. The processing circuit 322 may be configured to receive data from a number of devices (e.g., the devices 334-340) and multiplex the received data to a data stream as described herein with reference to the processing circuit 302.

Figure 4:
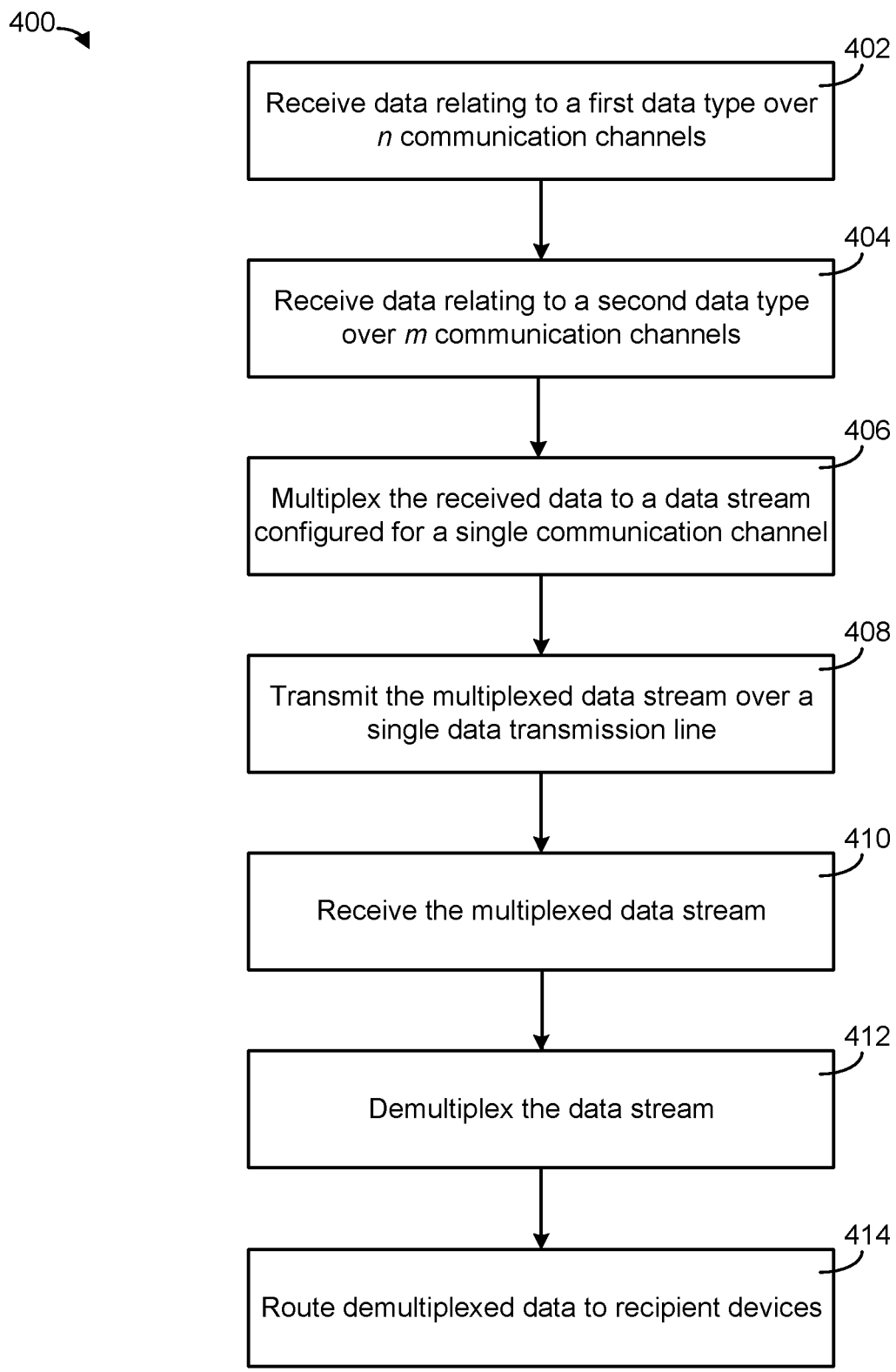
FIG. 4 is a flow diagram showing exemplary operations for multi-link channel bonding of system illustrated in FIG. 2, according to the inventive concepts disclosed herein.

Referring now to FIG. 4, an operational flow 400 of a process for multi-link channel bonding in an aircraft network infrastructure is shown according to the inventive concepts disclosed herein. In some embodiments, the embodiment described below may be performed by one or more processing circuits, such as the processing circuit 302 and/or the processing circuit 322. In other embodiments, the operational flow 400 may be performed using various hardware, apparatuses, and systems such as described herein.

At an operation 402, the processing circuit receives data relating to a first data type. The received data of the first data type may be provided from any number of devices and/or over any number of communication channels. The received data relating to the first data type may be intended to be routed to various devices configured to communicate data relating to first data type. Data relating to the first data type may be received from any source (e.g., the ACD system devices 202, the AISD system devices 204, the displays 206, the sensors 208, and the actuators 210). For example, the first data type may relate to deterministic information, and may be received from the ACD system devices 202. In another example embodiment, the first data type may relate to an ARINC standard, such as ARINC 664 and ARINC 818.

At an operation 404, the processing circuit receives data relating to a second data type. The received data of the second data type may be provided from any number of devices and/or over any number of communication channels. The received data relating to the second data type may be intended to be routed to various devices configured to communicate data relating to second data type. Data relating to the second data type may be received from any source (e.g., the ACD system devices 202, the AISD system devices 204, the displays 206, the sensors 208, and the actuators 210). For example, the second data type may relate to non-deterministic information, and may be received from the AISD system devices 204. In another example embodiment, the second data type may relate to an ARINC standard, such as ARINC 664 and ARINC 818.

At an operation 406, the processing circuit multiplexes the received data to a multiplexed data stream. The processing circuit may multiplex received data over multiple communication channels to a multiplexed data stream configured for a single communication channel. For example, referring to the above example, the first data type may relate to deterministic information provided over two communication channels, and the second data type may relate to non-deterministic information provided over another two communication channels. In this example, the processing circuit may multiplex data received over the four communication channels to a multiplexed data stream configured for a single communication channel.

The multiplexed data stream may correspond to, for example, time-division multiplexing, frequency-division multiplexing, code-division multiplexing, and/or any suitable multiplexing scheme. The processing circuit may multiplex received data to prioritize one or more data types and/or devices, for example to maintain a quality of service requirement, a bandwidth requirement, etc. For example, the processing circuit may prioritize data relating to deterministic information over data relating to non-deterministic information to maintain a minimum quality of service requirement for the deterministic information.

At an operation 408, the processing circuit transmits the multiplexed data stream over a data transmission line. The multiplexed data stream may be provided over the data transmission line as one communication channel. The multiplexed data stream, communication channel, and the data transmission line may be configured for any suitable communication protocol (e.g., TCP/IP, OSI, etc.). For example, the data transmission line may correspond to ethernet, fiber optic, etc. The multiplexed data stream, communication channel, and the data transmission line may be configured for any suitable layer (e.g., the data link layer). The processing circuit may transmit the multiplexed data stream over the data transmission line using any suitable communication interface as described herein. At an operation 410, a second processing circuit receives the multiplexed data stream. The second processing circuit may receive the multiplexed data stream using any suitable communication interface as described herein.

At an operation 412, the second processing circuit demultiplexes the multiplexed data stream. In some embodiments, the second processing circuit demultiplexes the multiplexed data stream based on the multiplexing scheme used by the first processing circuit (operation 406). In some embodiments, the second processing circuit demultiplexes the multiplexed data stream to a number of communication channels multiplexed by the processing circuit (operations 402-404). In some embodiments, the second processing circuit demultiplexes the multiplexed data stream to one or more data types of the multiplexed communication channels. In some embodiments, the second processing circuit demultiplexes the multiplexed data stream to data type or format readable by a number of recipient devices. In the example embodiment referred to with reference to operations 402-406, the second processing circuit may demultiplex the multiplexed data stream to four communication channels of data, whereby two communication channels correspond to data relating to ACD system devices and two communication channels correspond to data relating to AISD system devices.

At an operation 414, the second processing circuit routes the demultiplexed data to recipient devices. The recipient devices may be any device intended to receive data relating to the multiplexed data stream, such as the ACD system devices 212, the AISD system devices 214, the displays 216, the sensors 218, and the actuators 220. In some embodiments, the second processing circuit is configured to route data over one or more communication channels to the recipient devices. Referring to the above example embodiment, the second processing circuit may configure two communication channels for routing demultiplexed data relating to the ACD system devices and two communication channels for routing demultiplexed data relating to the AISD system devices. The second processing circuit may route demultiplexed data using any suitable communication interface as described herein.

The scope of this disclosure should be determined by the claims, their legal equivalents and the fact that it fully encompasses other embodiments, which may become apparent to those skilled in the art. All structural, electrical and functional equivalents to the elements of the above-described disclosure that are known to those of ordinary skill in the art are expressly incorporated herein by reference and are intended to be encompassed by the present claims. A reference to an element in the singular is not intended to mean one and only one, unless explicitly so stated, but rather it should be construed to mean at least one. No claim element herein is to be construed under the provisions of 35 U.S.C. § 112, sixth paragraph, unless the element is expressly recited using the phrase "means for." Furthermore, no element, component or method step in the present disclosure is intended to be dedicated to the public, regardless of whether the element, component or method step is explicitly recited in the claims.

Embodiments of the inventive concepts disclosed herein have been described with reference to drawings. The drawings illustrate certain details of specific embodiments that implement the systems and methods and programs of the present disclosure. However, describing the embodiments with drawings should not be construed as imposing any limitations that may be present in the drawings. The present disclosure contemplates methods, systems and program products on any machine-readable media for accomplishing its operations.

Embodiments of the inventive concepts disclosed herein may be implemented using an existing computer processor, or by a special purpose computer processor incorporated for this or another purpose or by a hardwired system.

Embodiments of the inventive concepts disclosed herein have been described in the general context of method steps which may be implemented in one embodiment by a program product including machine-executable instructions, such as program code, for example in the form of program modules executed by machines in networked environments. Generally, program modules include routines, programs, objects, components, data structures, etc. that perform particular tasks or implement particular abstract data types. Machine-executable instructions, associated data structures, and program modules represent examples of program code for executing steps of the methods disclosed herein. The particular sequence of such executable instructions or associated data structures represent examples of corresponding acts for implementing the functions described in such steps.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure.

The foregoing description of embodiments has been presented for purposes of illustration and description. It is not intended to be exhaustive or to limit the subject matter to the precise form disclosed, and modifications and variations are possible in light of the above teachings or may be acquired from practice of the subject matter disclosed herein. The embodiments were chosen and described in order to explain the principals of the disclosed subject matter and its practical application to enable one skilled in the art to utilize the disclosed subject matter in various embodiments and with various modifications as are suited to the particular use contemplated. Other substitutions, modifications, changes and omissions may be made in the design, operating conditions and arrangement of the embodiments without departing from the scope of the presently disclosed subject matter.

What is claimed is:

1. A system for an airborne platform, comprising:
   a first subsystem associated with one or more first devices corresponding to at least one first device type;
   at least one second subsystem, each second subsystem associated with one or more second devices corresponding to at least one second device type; and
   a first network controller communicably coupled to the first subsystem, to the second subsystem, and to at least one second network controller, wherein the first network controller comprises a processing circuit having a processor and a memory, the processing circuit configured to:
      receive from the one or more first devices at least one first data type, the at least one first data type relating to the at least one first device type;
      receive from the at least one second subsystem at least one second data type, the at least one second data type relating to the at least one second device type;
      detect, based on the at least one first data type and the at least one second data type, the at least one first device type—and the at least one second device type;
      multiplex the at least one first data type and the at least one second data type to a multiplexed data stream, the multiplexed data stream prioritizing at least one data type of the at least one first data type and the at least one second data type over another data type based on the at least one detected first and second device type, the multiplexed data stream configured for communication over a single communication channel; and
      transmit the multiplexed data stream to the second network controller over a data transmission line.

2. The system of claim 1, wherein at least one of the first or second network controller corresponds to an avionics control domain network switch.

3. The system of claim 1, wherein the first subsystem corresponds to an aircraft control domain and the at least one second subsystem includes an aircraft information services domain.

4. The system of claim 1, wherein the multiplexed data stream prioritizes the at least one data type over another data type based on the at least one of a quality of service requirement, a bandwidth requirement, or a deterministic status.

5. The system of claim 1, wherein the data transmission line is a fiber optic channel.

6. A method comprising:
   receiving, by a first aircraft-based processing circuit and from at least one first aircraft-based device corresponding to a first device type, a first data type relating to the first device type;
   receiving, by the first processing circuit and from at least one second aircraft-based device corresponding to a second device type, at least one second data type relating to the at least one second data type;
   detecting, by the first processing circuit, the first device type and the at least one second device type, based on the at least one first data type and the at least one second data type;
   multiplexing, by the first processing circuit, the first data type and the at least one second data type to a multiplexed data stream, the multiplexed data stream prioritizing at least one data type of the first data type and the at least one second data type over another data type based on the at least one detected first and second device type;

transmitting, by the first processing circuit, the multiplexed data stream to at least one second aircraft-based processing circuit over a data transmission line;

receiving, by the second processing circuit, the multiplexed data stream;

demultiplexing, by the second processing circuit, the multiplexed data stream to the first data type and the at least one second data type;

routing the first data type to at least one first recipient device corresponding to the first device type; and routing the at least one second data type to at least one second recipient device corresponding to the at least one second device type.

7. The method of claim 6, wherein at least one of the first processing circuit and the second processing circuit is provided with an avionics control domain network switch.

8. The method of claim 6, wherein the first device type relates to an aircraft control domain and the at least one second device type relates to an aircraft information services domain.

9. The method of claim 6, wherein prioritizing at least one data type of the first data type and the at least one second data type over another data type based on the at least one detected device type includes prioritizing the at least one-data type over another data type-based on at least one of a quality of service requirement, a bandwidth requirement, or a deterministic status.

10. A processing circuit of an aircraft, the processing circuit having a processor and a memory, and configured to:

receive a first data type from a first aircraft-based subsystem corresponding to a first device type;

receive at least one second data type from at least one second aircraft-based subsystem corresponding to at least one second device type;

detect, based on the first data type and the at least one second data type, the first device type and the at least one second device type;

multiplex the first data type and the at least one second data type to a multiplexed data stream, the multiplexed data stream prioritizing at least one data type of the first data type and the at least one second data type over another data type based on the at least one detected first and second device type, the first multiplexed data stream configured for communication over a single communication channel; and transmit the multiplexed data stream to an aircraft-based network controller over a data transmission line.

11. The processing circuit of claim 10, wherein the processing circuit is provided with an avionics control domain network switch.

12. The processing circuit of claim 10, wherein the first device type relates to an aircraft control domain and the at least one second device type relates to an aircraft information services domain.

13. The processing circuit of claim 10, wherein the first processing circuit multiplexes the first data and the second multiplexed data stream prioritizes the at least one data type over another data type based on at least one of a quality of service requirement, a bandwidth requirement, or a deterministic status.

14. The processing circuit of claim 10, wherein the data transmission line is a fiber optic channel.

\* \* \* \* \*